(No Model.)

I. L. G. RICE.
ELECTRIC GLASS CUTTING.

No. 539,302. Patented May 14, 1895.

Witnesses
Wm L Sheiden
Adene Williams

Inventor
Israel L. G. Rice

UNITED STATES PATENT OFFICE.

ISRAEL L. G. RICE, OF WESTON, MASSACHUSETTS.

ELECTRIC GLASS-CUTTING.

SPECIFICATION forming part of Letters Patent No. 539,302, dated May 14, 1895.

Application filed January 2, 1895. Serial No. 533,621. (No model.)

*To all whom it may concern:*

Be it known that I, ISRAEL L. G. RICE, a citizen of the United States, residing at Weston, in the county of Middlesex, State of Massachusetts, have invented certain new and useful Improvements in the Cutting of Glass; and I do hereby declare that the following is a full, clear, and exact description of the invention, which will enable others skilled in the art to which it appertains to use the same.

Heretofore sheets of glass and series of small articles molded together, have been cut with glaziers' diamonds, or by a small steel disk set in a handle and used similarly to the diamond. In cutting curved lines, or intricate patterns as required in the manufacture of designs and figures for stained glass windows, the work has to be done slowly, and with much skill and care, as the glass must first be scratched by the diamond in the place where it is to be cut and then held while the operator, with a pair of pinchers, breaks the glass at the scratched line. This process is tedious and expensive.

My invention consists of rapidly cutting glass by means of disruptive discharges of electricity, perforating small holes in the glass, near enough together so that the fine cracks will meet and cause a continuous cutting line to be formed. Glass being a substance presenting much resistance to the electric current, it is necessary to close the holes with a substance of greater resistance than the glass, otherwise the electricity will re-pass through the holes previously made. I attain these objects by the device illustrated in the accompanying drawings, in which—

Figure 1:
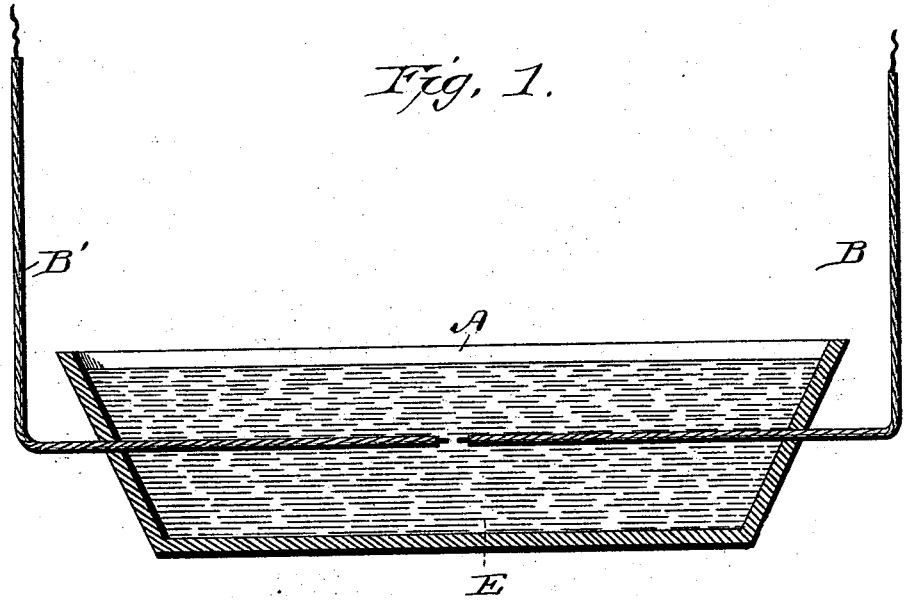
Figure 2:
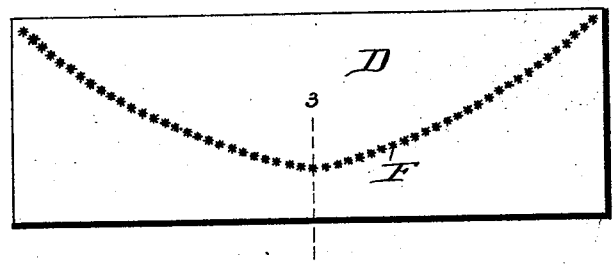
Figure 3:
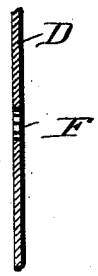

Figure 1 is a cross-section showing the vessel for holding the electric wires, the insulating material, and the glass. Fig. 2 is an elevation showing the glass with the perforations. Fig. 3 is a cross-section of the same.

Similar letters refer to similar parts throughout the several views.

One method of using my invention is to provide a vessel A, with two insulated wires, B and B'. One end of each of these wires is outside of the vessel and in suitable connection so as to transmit the electric discharge; the other end of each wire is placed inside the vessel and opposite to the other, with a narrow space between for the sheet of glass, D, to be inserted and moved. These wires may be adjusted by means of screws, springs, or other suitable devices to suit different thicknesses of glass. If the glass be of uniform thickness the wires may be set stationary. The vessel A is then filled with oil, E, so as to sufficiently cover the wires, the points touching, or nearly touching the glass, D, that is inserted between them. As the disruptive discharge of electricity takes place the perforation made through the glass is filled with oil, thus preventing the electricity from re-passing through it as it offers more resistance than glass. The glass is then moved a little and another discharge sent through the electrodes so that another perforation is made in the glass so close to the hole previously made, that it connects with it and forms a cutting line. A series of small holes, F, are made in the sheet, somewhat analogous to the cuts of a jig saw, and the pattern is cut out.

I do not limit or confine myself to any particular method of applying my invention. Any suitable material may be used for insulating. The wire from which the discharge passes, may be moved over the glass and the glass remain stationary, instead of the reverse method described.

What I claim as my invention, and desire to secure by Letters Patent, is—

1. The art of cutting glass by means of disruptive discharges of electricity, consisting in puncturing a series of holes through the glass in close proximity to each other and in lines, by means of disruptive discharges of electricity through the glass, the hole or holes nearest the electrodes being closed with a material having greater electrical resistance than the glass and the electrodes so insulated that the discharges will be made to pass through the glass, substantially as set forth.

2. In a device for cutting glass by the disruptive discharges of electricity, a vessel, containing oil or other fluid insulating material, in which is submerged, so as to be completely covered, that portion of the glass through which the disruptive discharge is to be sent, and also both of the electrodes, substantially as set forth.

ISRAEL L. G. RICE.

Witnesses:
GEO. MASON,
G. Y. AT LEE.